No. 660,921. Patented Oct. 30, 1900.
G. PÉRAUD.
FILTER FOR WINES OR OTHER LIQUIDS.
(Application filed Sept. 8, 1899.)
(No Model.) 3 Sheets—Sheet 1.

INVENTOR
GASTON PÉRAUD
BY Howson & Howson,
HIS ATTORNEYS.

WITNESSES:—
F. W. Wright
M. H. Miles

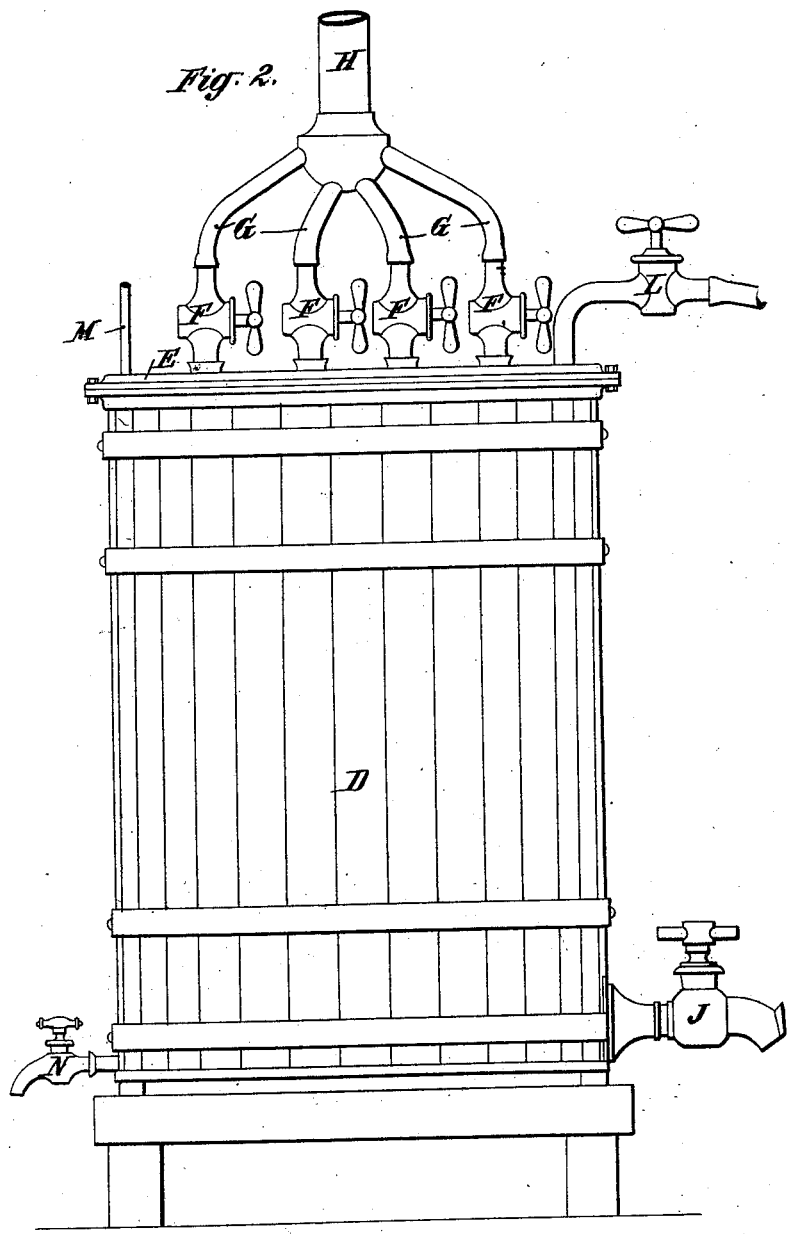

No. 660,921. Patented Oct. 30, 1900.
G. PÉRAUD.
FILTER FOR WINES OR OTHER LIQUIDS.
(Application filed Sept. 8, 1899.)

(No Model.) 3 Sheets—Sheet 3.

WITNESSES:
P. W. Wright
M. H. Miller

INVENTOR
GASTON PÉRAUD
BY Howson & Howson,
HIS ATTORNEYS.

THE NORRIS PETERS CO., PHOTO-LITHO., WASHINGTON, D. C.

UNITED STATES PATENT OFFICE.

GASTON PÉRAUD, OF LA ROCHELLE, FRANCE.

FILTER FOR WINES OR OTHER LIQUIDS.

SPECIFICATION forming part of Letters Patent No. 660,921, dated October 30, 1900.

Application filed September 8, 1899. Serial No. 729,870. (No model.)

*To all whom it may concern:*

Be it known that I, GASTON PÉRAUD, a citizen of the Republic of France, residing at La Rochelle, France, have invented certain new and useful Improvements in Filters for Wines or other Liquids, of which the following is a specification.

This invention relates to a filter for wines and other liquids, but more especially adapted for the filtration of wines, and which is capable of furnishing a large flow.

The characteristic features of the invention are that it enables a large quantity of liquid to be filtered in a short time and that it may be readily cleansed.

I will now describe my improved filter with reference to the accompanying drawings, in which—

Figure 3:
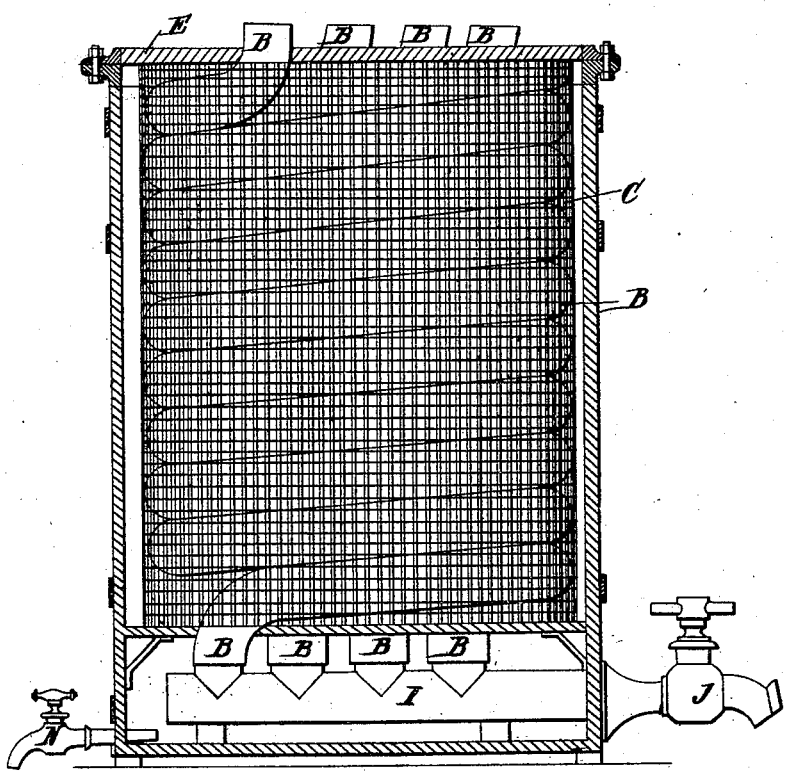
Figure 1:
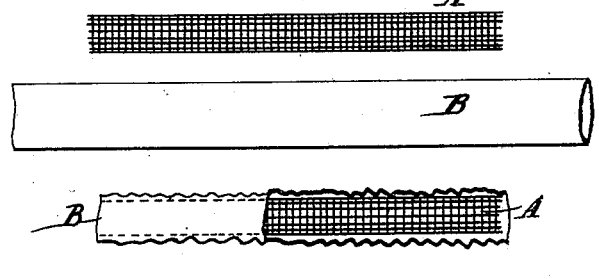
Figure 4:
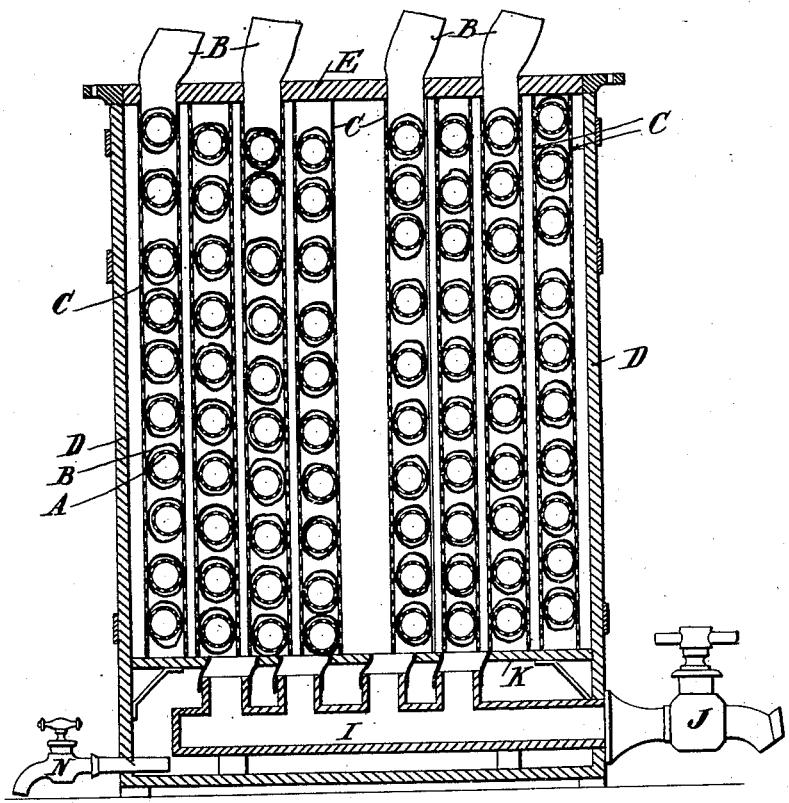
Figure 5:
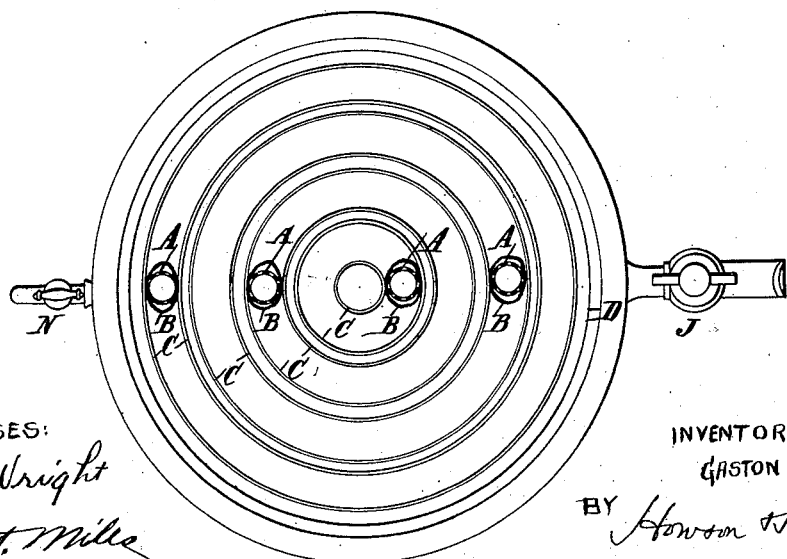

Figure 1 shows the manner in which one of the filtering tubes or hose is constituted. Fig. 2 represents the apparatus when mounted in external elevation. Fig. 3 is an internal view of the apparatus in elevation, the vessel containing the whole of the filtering-tubes being in section. Fig. 4 is a vertical section through the apparatus as a whole; and Fig. 5 is a plan view of the apparatus, the cover being removed.

This filter is essentially constituted by a hose or tube formed of a suitable fabric and spirally wound in the manner of a serpentine coil, and into this tube the liquid to be filtered is conducted. This liquid traverses the wall of the tube from its interior toward its exterior and is thus filtered. By establishing an apparatus consisting of several coils of decreasing diameters in such a manner that they are adapted to fit one within the other a filter having a very large surface and furnishing a considerable flow is formed. Each coil is constituted by a framework or body A, upon which is passed a sleeve or tube of filtering fabric B, Fig. 1, such framework forming an internal support for this tube. The framework A may be of any suitable kind, such as wicker, cane, metal wire, or perforated metal. Upon this framework is arranged the sleeve of suitable filtering fabric B, which is of such a width as not to fit tightly against the framework and of greater length than this latter, so that upon being reduced to the length of the supporting-framework it becomes plaited or gathered. A tube of filtering fabric is thus obtained which presents a very large surface. Fig. 1 shows the various phases of the construction of such a tube. The tube thus formed is wound spirally in order to form a coil and is placed between two cylindrical supports C C, which maintain it. These supports may be of wicker, cane, perforated metal, or the like, so that although affording support to the coil they do not impede the circulation of the liquid in the vessel in which the coil is arranged. Within the cylindrical space remaining vacant a second coil of suitable diameter, established in the same manner and likewise maintained between two supports C C, is arranged, then a third coil, and so on until the entire space is filled.

It is obvious that any desired number of coils may be provided. This will depend upon the filtering-surface which it is desired that the apparatus should furnish. These coils, maintained by their supports C C, are placed in a vessel D, closed by a cover E, through which pass the upper extremities of the various coils, each of which terminates in a cock F. These different cocks F F F are connected by pipes G G with a single pipe H, through which the liquid which it is desired to filter enters. At their lower portion the coils terminate in a pipe I, which passes outside the vessel and is provided with a cock J. The various supports C C, maintaining the coils, are retained in position by a partition K, arranged in the lower portion of the vessel.

Upon the cover E of the vessel, which hermetically closes this latter, is adapted the cock L, serving for the discharge of the filtered liquid, and also a pipe M for the liberation of air and carbonic acid. The vessel is provided at its lower portion with a drain cock or bung N.

In order to render the filter operative, the liquid to be filtered is caused to enter the pipe H. It is distributed among the various coils, passes through the walls of these latter and is thus filtered and fills the whole of the vacant space between the coils in the vessel D, from which it issues through the cock L.

When it is desired to cleanse the filter and expel from the coils the lees which have accumulated therein, the admission-cocks F F are closed and the cock upon the pipe I and also the drain-cock N are opened. The coils and the vessel are thus emptied, whereupon the cock F of one of the coils is opened. The liquid in passing through this carries with it the principal part of the lees or dregs, and the whole passes into the pipe I. This coil is therefore cleansed and its cock F is closed. The same procedure is adopted with all these coils. When the cleansing operation has been completed, the cock J upon the pipe I and the drain-cock N are closed and the cocks F F of the coils and also the cock are opened, whereupon the apparatus is again rendered operative.

It should be understood that I reserve the right to introduce into the apparatus above described any alterations or modifications whereby the principle of the device is not affected. Thus, for example, I reserve the right to establish the apparatus with any desired number of filtering-tubes. I do not confine myself to arranging these filtering-tubes in the trough in the form of coils. They may be arranged in any suitable manner.

Having now particularly described and ascertained the nature of my said invention and in what manner the same is to be performed, I declare that what I claim is—

A filter for liquids consisting of a vessel containing a number of filtering-tubes formed by a sleeve or tube of appropriate fabric and a supporting-framework for the fabric, which fabric is plaited or gathered upon this framework, as and for the purpose described.

In testimony whereof I have signed my name to this specification in the presence of two subscribing witnesses.

GASTON PÉRAUD.

Witnesses:
W. GELBAUER,
ALF. VAUD.